United States Patent
Balk et al.

(10) Patent No.: US 8,895,669 B2
(45) Date of Patent: *Nov. 25, 2014

(54) METHOD FOR PRODUCING ABA-TRIBLOCK COPOLYMERS WITH A BIMODAL B-BLOCK

(75) Inventors: Sven Balk, Frankfurt (DE); Holger Kautz, Haltern am See (DE); Stephan Fengler, Frankfurt (DE); Christine Troemer, Hammersbach (DE); Monika Maerz, Alzenau (DE); Lars Zander, Rommerskirchen (DE); Jens Lueckert, Barsinghausen (DE); Johann Klein, Duesseldorf (DE); Thomas Moeller, Duesseldorf (DE); Volker Erb, Duesseldorf (DE)

(73) Assignees: Evonik Roehm GmbH, Darmstadt (DE); Henkel AG & Co. KGaA, Duesseldorf (DE)

( * ) Notice: Subject to any disclaimer, the term of this patent is extended or adjusted under 35 U.S.C. 154(b) by 728 days.

This patent is subject to a terminal disclaimer.

(21) Appl. No.: 13/127,159

(22) PCT Filed: Oct. 6, 2009

(86) PCT No.: PCT/EP2009/062933

§ 371 (c)(1),
(2), (4) Date: May 2, 2011

(87) PCT Pub. No.: WO2010/054898

PCT Pub. Date: May 20, 2010

(65) Prior Publication Data

US 2011/0207876 A1    Aug. 25, 2011

(30) Foreign Application Priority Data

Nov. 12, 2008 (DE) .......................... 10 2008 043 668

(51) Int. Cl.
*C08F 293/00* (2006.01)
*C08F 265/06* (2006.01)
*C08F 2/38* (2006.01)
*C08F 2/00* (2006.01)
*C08F 2/06* (2006.01)
*C08F 6/02* (2006.01)
*C08L 53/00* (2006.01)
*C09D 153/00* (2006.01)
*C09J 153/00* (2006.01)

(52) U.S. Cl.
CPC . *C08F 2/38* (2013.01); *C08F 2/001* (2013.01); *C08F 2/06* (2013.01); *C08F 6/02* (2013.01); *C08F 293/005* (2013.01); *C08L 53/00* (2013.01); *C09D 153/00* (2013.01); *C09J 153/00* (2013.01); *C08F 2438/01* (2013.01)
USPC ............ 525/242; 525/244; 525/288; 525/299

(58) Field of Classification Search
CPC ...... C08F 293/00; C08F 293/05; C08F 2/001; C08F 2/06; C08F 2/38; C08F 6/02; C08F 2438/01; C08L 53/00; C09J 153/00; C09D 153/00
USPC .................. 525/242, 244, 245, 288, 298, 299
See application file for complete search history.

(56) References Cited

U.S. PATENT DOCUMENTS

| | | | |
|---|---|---|---|
| 6,087,451 A | 7/2000 | Georges et al. | |
| 6,258,911 B1 | 7/2001 | Georges et al. | |
| 7,868,098 B2 | 1/2011 | Loehden et al. | |
| 2007/0117948 A1 | 5/2007 | Loehden et al. | |
| 2009/0062508 A1 | 3/2009 | Balk et al. | |
| 2009/0275707 A1 | 11/2009 | Balk et al. | |
| 2009/0312498 A1 | 12/2009 | Balk et al. | |
| 2009/0326163 A1 | 12/2009 | Balk et al. | |
| 2010/0041852 A1 | 2/2010 | Balk et al. | |
| 2010/0280182 A1 | 11/2010 | Balk et al. | |

FOREIGN PATENT DOCUMENTS

| | | |
|---|---|---|
| EP | 1 637 550 | 3/2006 |
| WO | 2007 033887 | 3/2007 |
| WO | 2008 012116 | 1/2008 |

OTHER PUBLICATIONS

Ruzette, A.-V., et al., "Molecular Disorder and Mesoscopic Order in Polydisperse Acrylic Block Copolymers Prepared by Controlled Radical Polymerization," Macromolecules, vol. 39, pp. 5804-5814, (Jul. 22, 2006) XP 002556195.
Paris, R., et al., "Synthesis of crosslinkable ABA triblock copolymers based on allyl methacrylate by atom transfer radical polymerization," European Polymer Journal, vol. 44, pp. 1403-1413, (Feb. 15, 2008).
International Search Report issued Dec. 4, 2009 in PCT/EP09/062933 filed Oct. 6, 2009.
U.S. Appl. No. 13/125,177, filed Apr. 20, 2011, Kautz, et al.
U.S. Appl. No. 13/127,533, filed May 4, 2011, Balk, et al.
U.S. Appl. No. 13/127,534, filed May 4, 2011, Balk, et al.
U.S. Appl. No. 13/128,777, filed May 11, 2011, Balk, et al.
U.S. Appl. No. 13/128,957, filed May 12, 2011, Kautz, et al.

*Primary Examiner* — Irina S Zemel
*Assistant Examiner* — Jeffrey Lenihan
(74) *Attorney, Agent, or Firm* — Oblon, Spivak, McClelland, Maier & Neustadt, L.L.P.

(57) ABSTRACT

The invention relates to a controlled polymerization method for producing ABA-triblock copolymers on the basis of (meth)acrylate with A-blocks which have a narrow, monomodal molecular weight distribution and a B-block which has a bimodal molecular weight distribution, and to the use thereof as binders in glues and sealing materials.

19 Claims, No Drawings

METHOD FOR PRODUCING ABA-TRIBLOCK COPOLYMERS WITH A BIMODAL B-BLOCK

This application is a 371 of PCT/EP2009/062933, filed Oct. 6, 2009. Priority to German patent application 102008043668.2, filed Nov. 12, 2008, is claimed.

The invention relates to a controlled polymerization process for preparing (meth)acrylate-based ABA triblock copolymers having A blocks which have a narrow, monomodal molecular weight distribution, and a B block which has a bimodal molecular weight distribution, and also to the use thereof as binders in adhesives or sealants, for example.

Tailor-made copolymers with defined composition, chain length, molar mass distribution, etc. are a broad field of research. One of the distinctions made is between gradient polymers and block copolymers. A variety of applications are conceivable for such materials. A number of them will be briefly presented below.

Polymers may be prepared, for example, by way of ionic polymerization processes or by polycondensation or polyaddition. In these processes, the preparation of endgroup-functionalized products presents no problems. What does present a problem, however, is a targeted increase in molecular weight.

Polymers obtained through a free-radical polymerization process exhibit molecularity indices of well above 1.8. With a molecular weight distribution of this kind, therefore, there are automatically very short-chain polymers and also long-chain polymers present in the product as a whole. In a melt or in solution, the short-chain polymer chains exhibit a reduced viscosity, while in a polymer matrix they exhibit an increased mobility as compared with long-chain constituents. This has the twin effects first of improved processing properties for such polymers and second of an increased availability of polymer-bonded functional groups in a polymer composition or coating.

Long-chain by-products, in contrast, result in a more-than-proportionate increase in the viscosity of the polymer melt or solution. In addition, the migration of such polymers in a matrix is significantly reduced.

A disadvantage of free-radically prepared binders of this kind, however, is a statistical distribution of functional groups in the polymer chain. Moreover, using a free-radical polymerization method, there is no possibility either of a hard/soft/hard triblock architecture nor of the targeted synthesis of individual polymer blocks having narrow molecular weight distributions.

Block polymers have a sharp transition between the monomers in the polymer chain, which is defined as a boundary between the individual blocks. A typical synthesis process for AB block polymers is the controlled polymerization of monomer A and, at a later point in time, the addition of monomer B. Besides the sequential polymerization through batchwise addition to the reaction vessel, a similar result can also be obtained, in the case of a continuous addition of the two monomers, by sharply altering their compositions at particular points in time.

Suitable living or controlled polymerization methods include not only anionic polymerization or group-transfer polymerization but also modern methods of controlled radical polymerization such as, for example, RAFT polymerization. The ATRP method (atom transfer radical polymerization) was developed in the 1990s significantly by Prof. Matyjaszewski (Matyjaszewski et al., J. Am. Chem. Soc., 1995, 117, p. 5614; WO 97/18247; Science, 1996, 272, p. 866). ATRP yields narrowly distributed (homo)polymers in the molar mass range of $M_n$=10 000-120 000 g/mol. A particular advantage here is that the molecular weight can be regulated. As a living polymerization, furthermore, it allows the targeted construction of polymer architectures such as, for example, random copolymers or else block copolymer structures. Controlled-growth free-radical methods are also suitable particularly for the targeted functionalization of vinyl polymers. Particular interest attaches to functionalizations on the chain ends (referred to as telechelics) or in the vicinity of the chain ends. In contrast, targeted functionalization at the chain end is virtually impossible in the case of radical polymerization.

Binders with a defined polymer design can be made available through a controlled polymerization method, in the form of atom transfer radical polymerization, for example. For instance, ABA triblock copolymers have been described that possess an unfunctionalized B block and functionalized outer A blocks. Polymers of this kind are described in EP 1 475 397 with OH groups, in WO 2007/033887 with olefinic groups, in WO 2008/012116 with amine groups, and in the as yet unpublished DE 102008002016 with silyl groups. All of the polymers described in these specifications, however, have an explicitly narrow molecular weight distribution.

Via the so-called controlled polymerization processes, there have been no processes described that would enable polymers to be prepared having individual blocks or a plurality of blocks with a targetedly broad molecular weight distribution.

One method already established is that of end group functionalization of a poly(meth)acrylate with olefinic groups and the subsequent hydrosilylation of these groups. Processes of this kind are found in EP 1 024 153, EP 1 085 027, and EP 1 153 942, as well as others. The products in these specifications, however, are not block copolymers, and there is explicit reference to a molecular weight distribution of less than 1.6 for the product. A further disadvantage of these products as compared with polymers having multiply functionalized outer blocks is the higher probability of obtaining products which at one end are not functionalized. As a result of the lower degree of functionalization that results in each case as compared with the polymers of the invention, the result for further, downstream reactions, such as, for example, in the curing of sealant formulations, is a lower degree of crosslinking, and this runs counter to mechanical stability and chemical resistance.

Besides telechelics and block structures, an alternative is also represented by ATRP-synthesized—e.g., silyl-containing—(meth)acrylate copolymers having a statistical distribution and a narrow molecular weight distribution. A disadvantage of such binders is a close-knit crosslinking. Owing to the narrow molecular weight distribution, as well, binder systems of this kind have the advantages neither of particularly long or particularly short polymer chains present in the system.

Besides ATRP, other methods too are employed for the synthesis of functionalized polymer architectures. A further relevant method will be briefly described below. It is delimited from the present invention in terms both of the products and of the methodology. The advantages of ATRP over other processes are emphasized in particular:

In anionic polymerization, bimodalities may occur. These polymerization processes, however, are able to generate only certain functionalizations. For ATRP, bimodal distributions have been described for systems. The bimodality of these polymers, however, is a product in each case, first, of the presence of block copolymers and, second, of the presence of unreacted macroinitiators. A disadvantage of these processes is that the product is composed of a mixture of two different polymer compositions.

Problem

A new stage in the development are the triblock copolymers described below.

The problem addressed was that of providing a process for the synthesis of triblock polymers of the structure ABA from functionalized poly(meth)acrylates. These polymers are to be composed of A blocks with an inherently narrow molecular weight distribution of less than 1.6 and B blocks which have a bimodal molecular weight distribution with not only long polymer chains but also short polymer chains. There is a requirement in particular for ABA triblock copolymers whose B blocks, with a bimodal molecular weight distribution, have a polydispersity index of at least 1.8, and for ABA triblock copolymers comprising these B blocks having an overall polydispersity index of at least 1.8. In this context, ABA triblock copolymers are equated with pentablock copolymers of the composition ACBCA or CABAC.

A further problem was to provide ABA triblock copolymers or pentablock copolymers of the composition ACBCA or CABAC such that these polymers exclusively in the A blocks contain functional groups. Subject matter of this invention more particularly is a method for the targeted functionalization of the A blocks through the incorporation of suitable unsaturated monomers which have an additional functional group.

A further problem addressed by the present invention, therefore, among others, is to provide a binder for adhesives or sealants that has a block structure, is functionalized in a targeted way only in one type of blocks, and comprises short, viscosity-reducing chains and, at the same time, long, adhesion-promoting chains.

Solution

The problem has been solved by the provision of a new polymerization process which is based on atom transfer radical polymerization (ATRP).

A process is provided for preparing block copolymers which is characterized in that it is a sequentially implemented atom transfer radical polymerization (ATRP) where a bifunctional initiator is added to the polymerization solution in several portions and in that the block copolymer as a whole has a polydispersity index of greater than 1.8 and the block type B alone also has a polydispersity index of greater than 1.8. The polymer with a bimodal molecular weight distribution here is prepared by a process featuring twofold initiation.

A bimodal molecular weight distribution of a polymer or of a mixture of polymers is understood in accordance with the invention to refer to an overall molecular weight distribution which is made up of two different individual molecular weight distributions having different average molecular weights Mn and Mw. These two molecular weight distributions may be completely separate from one another, may overlap such that they have two distinguishable maxima, or may overlap such that a "shoulder" is formed in the overall molecular weight distribution. The overall molecular weight distribution is determined by means of gel permeation chromatography.

The block copolymers are prepared by means of a sequential polymerization process. This means that the monomer mixture for the synthesis of the blocks A, for example, is added to the system after a polymerization time $t_2$ only when the monomer mixture for the synthesis of block B, for example, has already undergone at least 90% reaction, preferably at least 95% reaction. This process ensures that the B blocks are free from monomers of the composition A, and that the A blocks contain less than 10%, preferably less than 5%, of the total amount of the monomers of the composition B. According to this definition, the block boundaries are located at the point in the chain at which the first repeating unit of the added monomer mixture—in this example, of the mixture A—is located. A conversion of only 95% has the advantage that the remaining monomers, especially in the case of acrylates, allow a more efficient transition to the polymerization of a second monomer composition, especially of methacrylates. In this way, the yield of block copolymers is significantly improved.

In the process of the invention, the initiator for the polymerization of the monomer mixture B is added to the polymer solution in two batches with a time stagger. With the first batch, the polymerization is initiated and polymer chains with relatively high molecular weight are formed by a polymerization time which is relatively long overall. After a time $t_1$ which may vary according to the target molecular weight, but is at least 30 minutes, preferably at least 60 minutes, the second monomer batch is added. As a result of this second initiation, polymers of the composition B with a relatively low molecular weight are formed initially. The first initiator charge makes up 10% to 90%, preferably 25% to 75%, of the total amount of initiator. Alternatively, a process is also possible in which the initiator is added in more than two batches. In this way, macroinitiators of the composition B are formed for the sequential construction of block copolymers of the composition ABA. These macroinitiators inherently have a molecular weight distribution with a polydispersity index of between 1.8 and 3.0, preferably between 1.9 and 2.5. Following the polymerization time $t_2$, finally, the monomer mixture A is added. The polymerization time $t_2$ is at least a further 60 minutes, preferably at least 90 minutes. As a result of the nature of ATRP, at this point in time there are both of the previously initiated polymer species of the composition B available for the polymerization, and the polymer blocks A are constructed under the known preconditions for ATRP. These segments of the polymer chains correspondingly exhibit inherently a narrow molecular weight distribution. In the case of pentablock polymers, blocks of type C or D as well may be constructed accordingly.

A further advantage of the present invention is the prevention of recombination. With this process, therefore, the formation of particularly high molecular weights can also be prevented. Such polymer constituents would make a more-than-proportionate contribution to increasing the solution viscosity or melt viscosity. Instead, the bimodal-distribution polymer prepared in accordance with the invention consists of two in each case inherently narrow and monomodal-distribution polymer species of similar construction. The polydispersity index of all of the polymers prepared in accordance with the invention is, however, greater than 1.8.

In accordance with the invention, as a measure of the nonuniformity of the molecular weight distribution, the polydispersity index is reported, as a ratio of the weight average to the number average of the molecular weights. The molecular weights are determined by means of gel permeation chromatography (GPC) against a PMMA standard.

A further embodiment of the present invention is the targeted functionalization of the A and/or D blocks in ABA, CABAC, ACBCA or CDBDC block copolymers with bimodal molecular weight distribution. The problem has been solved through the preparation of block copolymers with at least 1 and not more than 4 functional groups in the individual A blocks and D blocks, respectively, by monomer mixture A and D, respectively, being composed of a composition comprising functionalized (meth)acrylates and monomers selected from the group of the (meth)acrylates or mixtures thereof that have no additional functional group. The monomer mixtures B and C, in contrast, are composed exclusively of (meth)acrylates or mixtures thereof which have no additional functional group. These compositions may be identical or different from the fraction of the monomer mixture A that has no functional groups.

It has been found in particular that block copolymers of the invention with at least 1 and not more than 2 functional groups in the individual A blocks may also be prepared.

Not only to the copolymers of the block A but also to the copolymers of the block B and/or C, it is possible to add 0-50% by weight of monomers which are polymerizable by means of ATRP and which do not belong to the group of the (meth)acrylates.

The C blocks are polymer blocks which correspond to the basic composition of the A blocks but have no monomers containing functional groups. D blocks are polymer blocks which on the one hand correspond in terms of basic composition to the B block, and not to the C blocks, and on the other hand contain functional units.

Relative to the processes described in the prior art, with, for example, silyl-terminated binders in the composition, a relevantly higher degree of functionalization can be used to obtain improved crosslinkability in the products of the invention as well. Additionally, through a distribution of the reactive groups over the terminal segments—in this case the blocks A—, an excessively narrow-meshed crosslinking is ruled out. A terminal segment is a chain section which makes up in each case not more than 25% by mass and preferably not more than 10% by mass, and very preferably not more than 5% by mass, of the overall polymer chain.

Said functional groups which are present in the A blocks are restricted only through the selection of monomers which can be copolymerized by means of ATRP. The listing below serves only as an example for illustrating the invention, and is not such as to confine the invention in any way whatsoever.

Thus the A blocks may have OH groups. Hydroxy-functionalized (meth)acrylates suitable for this purpose are preferably hydroxyalkyl(meth)acrylates of straight-chain, branched or cycloaliphatic diols having 2-36 C atoms, such as, for example, 3-hydroxypropyl(meth)acrylate, 3,4-dihydroxybutyl mono(meth)acrylate, 2-hydroxyethyl(meth)acrylate, 4-hydroxybutyl(meth)acrylate, 2-hydroxy-propyl (meth)acrylate, 2,5-dimethyl-1,6-hexanediol mono(meth)acrylate, more preferably 2-hydroxyethyl methacrylate.

Amine groups are preparable, for example, through the copolymerization of 2-dimethylaminoethyl methacrylate (DMAEMA), 2-diethylaminoethyl methacrylate (DEAEMA), 2-tert-butylaminoethyl methacrylate (t-BAEMA), 2-dimethylaminoethyl acrylate (DMAEA), 2-diethylaminoethyl acrylate (DEAEA), 2-tert-butylaminoethyl acrylate (t-BAEA), 3-dimethylaminopropylmethacrylamide (DMAPMA) and 3-dimethylaminopropylacrylamide (DMAPA).

Polymers with allyl groups may be realized, for example, through the copolymerization of allyl(meth)acrylate. Polymers with epoxy groups through the copolymerization of glycidyl(meth)acrylate. Acid groups may be realized through the copolymerization of tert-butyl(meth)acrylate with subsequent hydrolysis and/or thermal elimination of isobutene.

Examples of (meth)acrylate-bound silyl radicals that may be recited include —SiCl$_3$, —SiMeCl$_2$, —SiMe$_2$Cl, —Si(OMe)$_3$, —SiMe(OMe)$_2$, —SiMe$_2$(OMe), —Si(OPh)$_3$, —SiMe(OPh)$_2$, —SiMe$_2$(OPh), —Si(OEt)$_3$, —SiMe(OEt)$_2$, —SiMe$_2$(OEt), —Si(OPr)$_3$, —SiMe(OPr)$_2$, —SiMe$_2$(OPr), —SiEt(OMe)$_2$, —SiEtMe(OMe), —SiEt$_2$(OMe), —SiPh(OMe)$_2$, —SiPhMe(OMe), —SiPh$_2$(OMe), —SiMe(OC(O)Me)$_2$, —SiMe$_2$(OC(O)Me), —SiMe(O—N=CMe$_2$)$_2$ or —SiMe$_2$(O—N=CMe$_2$).

Where the abbreviations are as follows: Me stands for methyl-, Ph for phenyl-, Et for ethyl-, and Pr for isopropyl- or n-propyl-. An example of a commercially available monomer is Dynasylan® MEMO from Evonik-Degussa GmbH. This compound is 3-methacryloyloxypropyl-trimethoxysilane.

It is advantageous that the monomers used for the functionalization are polymerized without crosslinking reactions occurring.

The (meth)acrylate notation stands for the esters of (meth)acrylic acid and here denotes not only methacrylate, such as methyl methacrylate, ethyl methacrylate, etc., for example, but also acrylate, such as methyl acrylate, ethyl acrylate, etc., for example, and also mixtures of both.

Monomers which are polymerized both in block A and in block B are selected from the group of (meth)acrylates such as, for example, alkyl(meth)acrylates of straight-chain, branched or cycloaliphatic alcohols having 1 to 40 C atoms, such as, for example, methyl(meth)acrylate, ethyl(meth)acrylate, n-butyl(meth)acrylate, isobutyl(meth)acrylate, tert-butyl(meth)acrylate, pentyl(meth)acrylate, 2-ethylhexyl (meth)acrylate, stearyl(meth)acrylate, lauryl(meth)acrylate, cyclohexyl(meth)acrylate, isobornyl(meth)acrylate; aryl (meth)acrylates such as, for example, benzyl(meth)acrylate or phenyl(meth)acrylate which may in each case have unsubstituted or mono- to tetra-substituted aryl radicals; other aromatically substituted (meth)acrylates such as, for example, naphthyl(meth)acrylate; mono(meth)acrylates of ethers, polyethylene glycols, polypropylene glycols or mixtures thereof having 5-80 C atoms, such as, for example, tetrahydrofurfuryl methacrylate, methoxy(m)ethoxyethyl methacrylate, 1-butoxypropyl methacrylate, cyclo-hexyloxymethyl methacrylate, benzyloxymethyl methacrylate, furfuryl methacrylate, 2-butoxyethyl methacrylate, 2-ethoxyethyl methacrylate, allyl-oxymethyl methacrylate, 1-ethoxybutyl methacrylate, 1-ethoxyethyl methacrylate, ethoxymethyl methacrylate, poly(ethylene glycol)methyl ether(meth)acrylate and poly(propylene glycol)methyl ether(meth)acrylate.

Besides the (meth)acrylates set out above it is possible for the compositions to be polymerized also to contain further unsaturated monomers which are copolymerizable with the aforementioned (meth)acrylates and by means of ATRP. These include, among others, 1-alkenes, such as 1-hexene, 1-heptene, branched alkenes such as, for example, vinylcyclohexane, 3,3-dimethyl-1-propene, 3-methyl-1-diisobutylene, 4-methyl-1-pentene, acrylonitrile, vinyl esters such as vinyl acetate, styrene, substituted styrenes with an alkyl substituent on the vinyl group, such as α-methylstyrene and α-ethylstyrene, substituted styrenes with one or more alkyl substituents on the ring such as vinyltoluene and p-methylstyrene, halogenated styrenes such as, for example, monochlorostyrenes, dichloro-styrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazole, vinyloxolane, vinylfuran, vinylthiophene, vinylthiolane, vinylthiazoles, vinyloxazoles and isoprenyl ethers; maleic acid derivatives, such as, for example, maleic anhydride, maleimide, methylmaleimide and dienes such as divinylbenzene, for example, and also, in the A blocks, the respective hydroxy-functionalized and/or amino-functionalized and/or mercapto-functionalized compounds. Furthermore, these copolymers may also be prepared such that they have a hydroxyl and/or amino and/or mercapto functionality in one substituent.

Examples of such monomers include vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles. Particular preference is given to copolymerizing vinyl esters, vinyl ethers, fumarates, maleates, styrenes or acrylonitriles with the A blocks and/or B blocks.

The process can be carried out in any desired halogen-free solvents. Preference is given to toluene, xylene, $H_2O$; acetates, preferably butyl acetate, ethyl acetate, propyl acetate; ketones, preferably ethyl methyl ketone, acetone; ethers; aliphatics, preferably pentane, hexane; biodiesel; but also plasticizers such as low-molecular-mass polypropylene glycols or phthalates.

The block copolymers of the composition ABA are prepared by means of sequential polymerization.

Besides solution polymerization the ATRP can also be carried out as emulsion, miniemulsion, microemulsion, suspension or bulk polymerization.

The polymerization can be carried out under atmospheric, subatmospheric or superatmospheric pressure. The temperature of polymerization is also not critical. In general, however, it is situated in the range from −20° C. to 200° C., preferably from 0° C. to 130° C. and with particular preference from 50° C. to 120° C.

The polymer of the invention preferably has a number-average molecular weight of between 5000 g/mol and 100 000 g/mol, with particular preference between 7500 g/mol and 50 000 g/mol and with very particular preference ≤30 000 g/mol.

As bifunctional initiators there can be $RO_2C$—CHX—$(CH_2)_n$—CHX—$CO_2R$, $RO_2C$—$C(CH_3)X$—$(CH_2)_n$—$C(CH_3)X$—$CO_2R$, $RO_2C$—$CX_2$—$(CH_2)_n$—$CX_2$—$CO_2R$, RC(O)—CHX—$(CH_2)_n$—CHX—C(O)R, RC(O)—$C(CH_3)$X—$(CH_2)_n$—$C(CH_3)X$—C(O)R, RC(O)—$CX_2$—$(CH_2)_n$—$CX_2$—C(O)R, $XCH_2$—$CO_2$—$(CH_2)_n$—OC(O) $CH_2X$, $CH_3$CHX—$CO_2$—$CH_2)_n$—OC(O)CHXCH$_3$, $(CH_3)_2$CX—$CO_2$—$(CH_2)_n$—OC(O)CX(CH$_3$)$_2$, $X_2$CH—$CO_2$—$(CH_2)_n$—OC(O)CHX$_2$, $CH_3CX_2$—$CO_2$—$(CH_2)_n$—OC(O)$CX_2CH_3$, $XCH_2C(O)C(O)CH_2X$, $CH_3$CHXC(O)C(O)CHXCH$_3$, XC(CH$_3$)$_2$C(O)C(O)CX(CH$_3$)$_2$, $X_2$CHC(O)C(O)CHX$_2$, $CH_3CX_2C(O)C(O)CX_2CH_3$, $XCH_2$—C(O)—$CH_2X$, $CH_3$—CHX—C(O)—CHX—$CH_3$, CX(CH$_3$)$_2$—C(O)—CX(CH$_3$)$_2$, $X_2$CH—C(O)—CHX$_2$, $C_6H_5$—CHX—$(CH_2)_n$—CHX—$C_6H_5$, $C_6H_5$—$CX_2$—$(CH_2)_n$—$CX_2$—$C_6H_5$, $C_6H_5$—$CX_2$—$(CH_2)_n$—$CX_2$—$C_6H_5$, o-, m- or p-$XCH_2$-Ph-$CH_2X$, o-, m- or p-$CH_3$CHX-Ph-CHXCH$_3$, o-, m- or p-$(CH_3)_2$CX-Ph-CX(CH$_3$)$_2$, o-, m- or p-$CH_3CX_2$-Ph-$CX_2CH_3$, o-, m- or p-$X_2$CH-Ph-CHX$_2$, o-, m- or p-$XCH_2$—$CO_2$-Ph-OC(O) $CH_2X$, o-, m- or p-$CH_3$CHX—$CO_2$-Ph-OC(O)CHXCH$_3$, o-, m- or p-$(CH_3)_2$CX—$CO_2$-Ph-OC(O)CX(CH$_3$)$_2$, $CH_3CX_2$—$CO_2$-Ph-OC(O)$CX_2CH_3$, o-, m- or p-$X_2$CH—$CO_2$-Ph-OC(O)CHX$_2$ or o-, m- or p-$XSO_2$-Ph-$SO_2X$ (X stands for chlorine, bromine or iodine; Ph stands for phenylene ($C_6H_4$); R represents an aliphatic radical of 1 to 20 carbon atoms, which may be linear, branched or else cyclic in structure, may be saturated or mono- or polyunsaturated and may contain one or more aromatics or else is aromatic-free, and n is a number between 0 and 20). Preference is given to using 1,4-butanediol di(2-bromo-2-methylpropionate), 1,2-ethylene glycol di(2-bromo-2-methylpropionate), diethyl 2,5-dibromo-adipate or diethyl 2,3-dibromomaleate. The ratio of initiator to monomer gives the later molecular weight, provided that all of the monomer is reacted.

Catalysts for ATRP are set out in Chem. Rev. 2001, 101, 2921. The description is predominantly of copper complexes—among others, however, compounds of iron, of rhodium, of platinum, of ruthenium or of nickel are employed. In general it is possible to use any transition metal compounds which, with the initiator, or with the polymer chain which has a transferable atomic group, are able to form a redox cycle. Copper can be supplied to the system for this purpose, for example, starting from $Cu_2O$, CuBr, CuCl, CuI, $CuN_3$, CuSCN, CuCN, $CuNO_2$, $CuNO_3$, $CuBF_4$, $Cu(CH_3COO)$ or $Cu(CF_3COO)$.

One alternative to the ATRP described is represented by a variant of it: In so-called reverse ATRP, compounds in higher oxidation states can be used, such as $CuBr_2$, $CuCl_2$, CuO, $CrCl_3$, $Fe_2O_3$ or $FeBr_3$, for example. In these cases the reaction can be initiated by means of conventional free-radical initiators such as, for example, AIBN. In this case the transition metal compounds are first reduced, since they are reacted with the radicals generated from the conventional free-radical initiators. Reverse ATRP has been described by, among others, Wang and Matyjaszewski in Macromolecules (1995), vol. 28, p. 7572 ff.

One variant of reverse ATRP is represented by the additional use of metals in the zero oxidation state. As a result of an assumed comproportionation with the transition metal compounds in the higher oxidation state, an acceleration is brought about in the reaction rate. This process is described in more detail in WO 98/40415.

The molar ratio of transition metal to bifunctional initiator is generally situated in the range from 0.02:1 to 20:1, preferably in the range from 0.02:1 to 6:1 and with particular preference in the range from 0.2:1 to 4:1, without any intention hereby to impose any restriction.

In order to increase the solubility of the metals in organic solvents and at the same time to prevent the formation of stable and hence polymerization-inert organometallic compounds, ligands are added to the system. Additionally, the ligands facilitate the abstraction of the transferable atomic group by the transition metal compound. A listing of known ligands is found for example in WO 97/18247, WO 97/47661 or WO 98/40415. As a coordinative constituent, the compounds used as ligand usually contain one or more nitrogen, oxygen, phosphorus and/or sulfur atoms. Particular preference is given in this context to nitrogen-containing compounds. Very particular preference is enjoyed by nitrogen-containing chelate ligands. Examples that may be given include 2,2'-bipyridine, N,N,N',N'',N''-pentamethyldiethylenetriamine (PMDETA), tris(2-aminoethyl)amine (TREN), N,N,N',N'-tetramethylethylenediamine or 1,1,4,7,10,10-hexamethyltriethylenetetramine. Valuable indicators relating to the selection and combination of the individual components are found by the skilled person in WO 98/40415.

These ligands may form coordination compounds in situ with the metal compounds or they may first be prepared as coordination compounds and then introduced into the reaction mixture.

The ratio of ligand (L) to transition metal is dependent on the denticity of the ligand and on the coordination number of the transition metal (M). In general the molar ratio is situated in the range 100:1 to 0.1:1, preferably 6:1 to 0.1:1 and with particular preference 3:1 to 1:1, without any intention hereby to impose any restriction.

When ATRP has taken place, the transition metal compound can be precipitated by the addition of a suitable sulfur compound. By addition of mercaptans, for example, the halogen atom at the end of the chain is substituted, with release of a hydrogen halide. The hydrogen halide—HBr, for example—protonates the ligand L, coordinated on the transition metal, to form an ammonium halide. As a result of this process, the transition metal-ligand complex is quenched and the "bare" metal is precipitated. After that the polymer solution can easily be purified by means of a simple filtration. The said sulfur compounds are preferably compounds containing an SH group. With very particular preference they are one of the chain transfer agents known from free-radical polymerization, such as ethylhexyl mercaptan or n-dodecyl mercaptan.

A broad field of application is produced for these products. The selection of the use examples is not such as to restrict the use of the polymers of the invention. The examples should solely serve to illustrate in a random manner the broad field of application of the described polymers. Block copolymers with reactive groups of the composition ABA, ACBCA, CABAC and/or CDBDC may be employed preferably as prepolymers for a moisture-curing crosslinking. The prepolymers can be crosslinked with any desired polymers.

The preferred applications for the block copolymers of the composition ABA, ACBCA, CDBDC or CABAC having ≤4 silyl groups in the individual A and/or D blocks of the invention are to be found in sealants, in reactive hotmelt adhesives or in adhesive bonding compositions. Particularly appropriate uses are in sealants for applications in the fields of automotive engineering, shipbuilding, container construction, mechanical engineering and aircraft engineering, and also in the electrical industry and in the building of domestic appliances. Further preferred fields of application are those of sealants for building applications, heat-sealing applications or assembly adhesives.

The possible applications for materials produced in accordance with the invention do not, however, include only binders for sealants or intermediates for the introduction of other kinds of functionalities. EP 1 510 550, for example, describes a coating composition whose constituents include acrylate particles and polyurethanes. A polymer of the invention in a corresponding formulation would result in an improvement in the processing properties and crosslinking properties. Conceivable applications are, for example, powder coating formulations.

With the new binders it is possible to prepare crosslinkable one-component and two-component elastomers for example for one of the recited applications. Typical further ingredients of a formulation are the binder, solvents, fillers, pigments, plasticizers, stabilizing additives, water scavengers, adhesion promoters, thixotropic agents, crosslinking catalysts, tackifiers, etc.

In order to reduce the viscosity it is possible to use solvents, examples being aromatic hydrocarbons such as toluene, xylene, etc., esters such as ethyl acetate, butyl acetate, amyl acetate, Cellosolve acetate, etc., ketones such as methyl ethyl ketone, methyl isobutyl ketone, diisobutyl ketone, etc. The solvent may be added as early as during the radical polymerization. Crosslinking catalysts for hydrosilylated binders in a formulation for example with corresponding polyurethanes are the common organic tin, lead, mercury and bismuth catalysts, examples being dibutyltin dilaurate (e.g. from BNT Chemicals GmbH), dibutyltin diacetate, dibutyltin diketonate (e.g. Metatin 740 from Acima/Rohm+Haas), dibutyltin dimaleate, tin naphthenate, etc. It is also possible to use reaction products of organic tin compounds, such as dibutyltin dilaurate, with silicic esters (e.g. DYNASIL A and 40), as crosslinking catalysts. Also, in addition, titanates (e.g. tetrabutyl titanate, tetrapropyl titanate, etc.), zirconates (e.g. tetrabutyl zirconate, etc.), amines (e.g. butylamine, diethanolamine, octylamine, morpholine, 1,3-diazabicyclo[5.4.6]undec-7-ene (DBU), etc.) and/or their carboxylic salts, low molecular mass polyamides, amino organosilanes, sulfonic acid derivatives, and mixtures thereof.

One advantage of the block copolymers is the colorlessness and also the odorlessness of the product produced.

A further advantage of the present invention is the restricted number of functionalities in the respective functionalized polymer blocks. A higher fraction of functional groups in the binder results in possible premature gelling or at least in an additional increase in the solution viscosity and melt viscosity.

Owing to the relatively high number of reactive groups in the chain end segment, reaction of the silyl groups is more likely and crosslinking to form a narrow-meshed elastomer proceeds considerably more quickly. Targeted control of the crosslinking density and/or of the properties of the crosslinked end product is improved by a distribution of the functionalities in the end segments.

The examples given below are given for the purpose of improved illustration of the present invention, but are not apt to restrict the invention to the features disclosed herein.

EXAMPLES

The number-average and weight-average molecular weights Mn and Mw and the polydispersity index D=Mw/Mn as a measure of the molecular weight distributions are determined by means of gel permeation chromatography (GPC) in tetrahydrofuran relative to a PMMA standard.

Example 1

A jacketed vessel equipped with stirrer, thermometer, reflux condenser, nitrogen introduction tube and dropping funnel was charged under an $N_2$ atmosphere with monomer 1a (precise name and quantity in table 1), 120 ml of propyl acetate, copper(I) oxide (for amount see table 1) and N,N,N',N'',N''-pentamethyldiethylenetriamine (PMDETA, for amount see table 1). The solution is stirred at 80° C. for 15 minutes. Subsequently, at the same temperature, an amount of an initiator 1 (see table 1), 1,4-butanediol di(2-bromo-2-methylpropionate) (BDBIB, in 10 ml of propyl acetate) is added. After a reaction time of two hours, an amount of the initiator (see table 1), 1,4-butanediol di(2-bromo-2-methylpropionate) (BDBIB, in 10 ml of propyl acetate) is added to the reaction solution. After the polymerization time of an additional 1.5 hours, a sample is taken for determination of the average molar weight $M_n$ (by means of SEC) and a mixture of monomer 2a and monomer 3a (for precise name and amount see table 1) is added. The mixture is stirred at 80° C. for two hours more and then terminated by addition of 3.0 g of n-dodecyl mercaptan. The solution is worked up by filtration over silica gel and the subsequent removal of volatile constituents by means of distillation. The average molecular weight is determined, finally, by SEC measurements. The proportion of incorporated monomer 3a is quantified by $^1$H-NMR measurements.

Example 2

In the same way as for example 1, the monomers 1b, 2b and 3b (precise name and amount in table 1) are used.

Example 3

In the same way as for example 1, the monomers 1c, 2c, and 3c (precise name and amount in table 1) are used. In the initial charge, 180 g of propyl acetate are used.

Example 4

In the same way as for example 1, the monomers 1d, 2d, and 3d (precise name and amount in table 1) are used.

Example 5

In the same way as for example 1, the monomers 1e, 2e, and 3e (precise name and amount in table 1) are used.

TABLE 1

| Example | 1 | 2 | 3 | 4 | 5 |
|---|---|---|---|---|---|
| Monomer 1 | 1a) n-BA | 1b) n-BA | 1c) n-BA | 1d) n-BA | 1e) n-BA |
| Amount | 120.4 g | 120.5 g | 200.6 g | 121.6 g | 121.4 g |
| Copper (I) oxide | 0.8 g | 0.8 g | 1.3 g | 2.4 g | 2.4 g |
| PMDETA | 2.0 g | 2.0 g | 3.3 g | 6.0 g | 6.0 g |
| Initiator 1 | 1.01 g | 1.01 g | 0.85 g | 3.06 g | 2.36 g |
| Initiator 2 | 1.01 g | 1.01 g | 2.52 g | 3.06 g | 4.13 g |
| Monomer 2 | 2a) n-BA | 2b) MMA | 2c) n-BA | 2d) n-BA | 2e) n-BA |
| Amount | 30.1 g | 30.2 g | 50.2 g | 30.3 g | 30.3 g |
| Monomer 3 | 3a) MEMO | 3b) MEMO | 3c) MEMO | 3d) AMA | 3e) HEMA |
| Amount | 6.2 g | 6.2 g | 10.4 g | 10.5 g | 9.9 g |
| $M_n$ (stage 1) | 26 500 | 28 600 | 26 500 | 11 500 | 7500 |
| D | 2.15 | 1.98 | 2.15 | 1.95 | 3.14 |
| $M_n$ (end product) | 31 800 | 34 800 | 31 900 | 14 600 | 11 500 |
| D | 2.07 | 2.02 | 2.07 | 1.81 | 2.02 |

MMA = methyl methacrylate;
n-BA = n-butyl acrylate,
MEMO = Dynasylan MEMO (3-methacryloxypropyltrimethoxysilane),
AMA = allyl methacrylate,
HEMA = 2-hydroxyethyl methacrylate The molecular weight distributions of the first polymerization stages are in each case bimodal and have a molecularity index D of greater than 1.8. The end products have correspondingly large molecularity indices, albeit smaller than those of the pure B blocks. This effect is a result of the higher molecular weight overall, but also shows that the polymerization of the A blocks is controlled and that the blocks per se have a narrow molecular weight distribution. The increase in the molecularity index in example 2 is attributable to a high-molecular-weight "shoulder". This results from secondary reactions of the silyl groups with a partial chain dimerization.

Following removal of the solvent, the silyl-functionalized products can be stabilized by addition of suitable drying agents. This ensures a good shelflife without further increase in molecular weight.

The transposition of the results to pentablock copolymers of the composition ACBCA or CABAC may take place in an analogous way. The synthesis of such copolymers with narrow distribution is described in, for example, the present applicant's patent application DE 102008002016, not yet laid open.

Comparative Example 1

A jacketed vessel equipped with stirrer, thermometer, reflux condenser, nitrogen introduction tube and dropping funnel was charged under an $N_2$ atmosphere with monomer 1f (precise name and quantity in table 2), 125 ml of propyl acetate, 0.5 g of copper(I) oxide and 1.3 g of N,N,N',N'',N''-pentamethyldiethylenetriamine (PMDETA). The solution is stirred at 80° C. for 15 minutes. Subsequently, at the same temperature, initiator 1,4-butanediol di(2-bromo-2-methylpropionate) dissolved in 25 ml of propyl acetate (BDBIB, for amount see table 2) is added. After the polymerization time of three hours a sample is taken for determination of the average molar weight $M_n$ (by means of SEC) and a mixture of monomer 2f and monomer 3f (for precise name and amount see table 2) is added. The mixture is polymerized to an anticipated conversion of at least 95% and is terminated by addition of 2.1 g of n-dodecyl mercaptan. The solution is worked up by filtration over silica gel and the subsequent removal of volatile constituents by means of distillation. The average molecular weight is determined, finally, by SEC measurements.

Comparative Example 2

In the same way as for comparative example 1, the monomers 1g, 2g and 3g (precise name and amount in table 2) are used.

Comparative Example 3

In the same way as for comparative example 1, the monomers 1h, 2h and 3h (precise name and amount in table 2) are used.

TABLE 2

| Comp. Ex. | 1 | 2 | 3 |
|---|---|---|---|
| Monomer 1 | 1f) MMA | 1g) n-BA | 1h) n-BA |
| Amount | 81.0 g | 79.6 g | 79.6 g |
| Monomer 2 | 2f) MMA | 2g) MMA | 2h) n-BA |
| Amount | 19.9 g | 19.9 g | 20.0 g |
| Monomer 3 | 3f) MEMO | 3g) MEMO | 3h) MEMO |
| Amount | 4.8 g | 4.8 g | 4.8 g |
| Amount of initiator | 1.25 g | 1.25 g | 1.25 g |
| $M_n$ (stage 1) | 21 600 | 17 800 | 18 100 |
| D | 1.21 | 1.22 | 1.28 |
| $M_n$ (end product) | 26 800 | 20 300 | 22 500 |
| D | 1.31 | 1.36 | 1.38 |

The comparative examples show that with conventional addition of initiator in one batch, polymers are formed that have relatively narrowly distributed inner blocks and molecularity indices of less than 1.4.

The invention claimed is:

1. A process for preparing a block copolymer by a sequentially implemented atom transfer radical polymerization (ATRP), the process comprising:
    adding a bifunctional initiator to a polymerization solution in two batches, a first initiator batch and a second initiator batch,
    wherein the block copolymer has an ABA composition and an overall molecular weight distribution with a polydispersity index of greater than 1.8.

2. The process of claim 1, wherein block A is a copolymer having a monomodal molecular weight distribution, and
    wherein block B is a copolymer having a bimodal molecular weight distribution with a polydispersity index of greater than 1.8.

3. The process of claim 2, wherein individual A blocks each make up less than 25% of a total weight of the block copolymer which has an ABA composition.

4. A process of claim 1 further comprising:
incorporating block C components into the copolymer before or after block A components,
wherein block C is a copolymer block having a monomodal molecular weight distribution,
wherein the block copolymer has a composition ACBCA or CABAC, and
wherein there are no monomers with further functional groups than a (meth)acrylate in block C.

5. The process of claim 1, wherein the initiator is added in two batches separated by a time stagger, and the first initiator batch accounts for 10% to 90% of the overall amount of initiator.

6. The process of claim 1, wherein the individual A blocks of the block copolymer have a composition with at least 1 and not more than 4 functional groups.

7. The process of claim 6, wherein block A comprises, in copolymerized form, at least one monomer which comprises:
an unsaturated, free-radically polymerizable group; and
a second functional group selected from the group consisting of hydroxyl group, an amine group, an allyl group, a silyl group, and an epoxy group,
copolymerized into the A blocks.

8. The process of claim 1, wherein the block copolymer has a number-average molecular weight of between 5000 g/mol and 100 000 g/mol.

9. The process of claim 1, further comprising:
precipitating an ATRP catalyst after the polymerization by adding a mercaptan or a compound comprising a thiol group to the polymerization solution; and
separating off the ATRP catalyst from the polymerization solution by filtration.

10. The process of claim 1, wherein the initiator is added in two batches separated by a time stagger, and the first initiator batch accounts for 25% to 75% of the overall amount of initiator.

11. The process of claim 1, wherein the individual A blocks of the block copolymer have a composition with at least 1 and not more than 2 functional groups.

12. The process of claim 1, wherein the A and B blocks of the block copolymer each comprise one or more (meth)acrylates.

13. The process of claim 12, wherein at least one of the A and B blocks additionally comprises at least one monomer selected from the group consisting of a vinyl ester, a vinyl ether, a fumarate, a maleate, a styrene, and an acrylonitrile.

14. An ABA triblock copolymer, obtained by the process of claim 1, comprising, in polymerized form, at least one (meth)acrylate,
wherein block A has a monomodal molecular weight distribution, and
wherein block B has a bimodal molecular weight distribution with a polydispersity index of greater than 1.8.

15. The block copolymer of claim 14, having an overall polydispersity index of greater than 1.8,
wherein the polydispersity index of the block copolymer is less than that of block B.

16. A hotmelt adhesive fluid adhesive, a pressure-sensitive adhesive, an elastic sealant, a coating material or a foam precursors, comprising the block polymer of claim 14.

17. A heat-sealing composition, comprising the block copolymer of claim 14.

18. A crosslinkable composition, comprising the block copolymer of claim 14, wherein the block copolymer has at least one reactive functional group.

19. A pentablock copolymer, obtained by the process of claim 4, comprising at least one (meth)acrylate,
wherein the pentablock copolymer has an ACBCA or CABAC composition,
wherein the blocks A and C are each a copolymer having a monomodal molecular weight distribution, and blocks A and C each comprise at least one (meth)acrylate,
wherein block B is a copolymer having a bimodal molecular weight distribution with a polydispersity index of greater than 1.8 and comprises at least one (meth)acrylate, and
the pentablock copolymer has an overall polydispersity index of greater than 1.8.

* * * * *